United States Patent

[11] 3,623,023

[72] Inventor Robert E. Oleksiak
Carlisle, Mass.
[21] Appl. No. 687,166
[22] Filed Dec. 1, 1967
[45] Patented Nov. 23, 1971
[73] Assignee Sperry Rand Corporation

[54] VARIABLE THRESHOLD TRANSISTOR MEMORY USING PULSE COINCIDENT WRITING

6 Claims, 4 Drawing Figs.

[52] U.S. Cl. .......... 340/173 R, 307/238, 307/304
[51] Int. Cl. .......... G11c 11/40
[50] Field of Search .......... 340/173; 307/279, 304, 251, 205

[56] References Cited
UNITED STATES PATENTS
3,416,008 12/1968 Memelink et al. .......... 307/238 X

*Primary Examiner*—Rodney D. Bennett, Jr.
*Assistant Examiner*—Daniel C. Kaufman
*Attorney*—S. C. Yeaton

ABSTRACT: A computer memory utilizing variable threshold transistor memory cells for storing respective digital bit data. Each transistor is characterized by an electrically controllable conduction threshold which is set by the simultaneous application of pulses to the gate electrode and to the substrate, each pulse having half the amplitude required for threshold setting. The gate pulses are square waves centered about zero volts while the substrate pulses are unidirectional and of a polarity representing the binary state into which the memory cell is to be placed. Thus, the memory cells are placed into the ZERO state and the ONE state during respective portions of the writing cycle.

INVENTOR.
ROBERT E. OLEKSIAK
BY
Robert J. Haase
ATTORNEY

INVENTOR.
ROBERT E. OLEKSIAK
BY Robert J. Haase
ATTORNEY

INVENTOR.
ROBERT E. OLEKSIAK
BY
Robert J. Haase
ATTORNEY

VARIABLE THRESHOLD TRANSISTOR MEMORY USING PULSE COINCIDENT WRITING

BACKGROUND OF THE INVENTION

Copending patent application, Ser. No. 648,414, filed June 23, 1967, now Patent 3,508,211 for "Electrically Alterable NonDestructive Readout Field Effect Transistor Memory" in the name of Horst A. R. Wegener and assigned to the present assignee discloses a matrix of variable conduction threshold transistor memory cells. Each variable threshold transistor memory cell is an insulated gate field effect transistor utilizing silicon nitride as the gate insulating material. The conduction threshold of the transistor is electrically alterable by impressing a binary polarity voltage between the gate electrode and the substrate in excess of a predetermined finite amount. The polarity of the voltage determines the sense in which the threshold is varied. Upon the application to the gate electrode of a fixed voltage having a value intermediate the binary valued conduction thresholds, the binary condition of the transistor can be sensed by monitoring the magnitude of the resulting current between the source and drain. The amplitude of the sensing voltage is insufficient to change the preexisting conducting threshold so that nondestructive readout is achieved.

An outstanding advantage of the variable threshold memory cell is that it is completely compatible with the use of integrated microelectric circuit fabrication techniques and devices in digital computers. As is well understood in the art, the manufacturing yield of acceptable integrated circuits per semiconductor slice is roughly proportional to the number of circuits simultaneously formed upon the slice and is inversely proportional to the active area (number of transistors) per circuit. Accordingly, it is always desirable that each required function be performed by the simplest circuit utilizing the fewest possible number of transistors so that yield is maximized.

SUMMARY OF THE INVENTION

The present invention provides a computer memory and driving circuits for writing binary data into the memory and for reading stored data from the memory. The entire combination of memory and driving circuits is designed for maximum exploitation of modern integrated microelectronic circuit techniques. Increased yield of acceptable integrated microelectronic circuits is achieved through the simplification of the writing and reading circuits toward the minimization of the number of transistors required by said driving circuits. For the purpose of the present disclosure, only the variable conduction threshold transistors constitute the computer memory; all other devices constitute the driving circuits.

Writing is achieved by the application of a square wave (binary polarity) voltage to the gate of the addressed variable threshold transistor and a voltage of predetermined polarity to the substrate thereof. Each of the two voltages is one-half the magnitude required to alter the transistor conduction threshold. Alternation of the conduction threshold is achieved during that half cycle of the gate square wave voltage which is opposite in polarity to the substrate potential whereupon the difference in potential between the gate and substrate equals the full magnitude required for threshold alteration. The sense of the gate-to-substrate potential determines the direction of threshold shift, and hence, the kind of stored binary date. Thus, binary ZEROS and binary ONES are written into respective memory cells during different portions of the writing period. Conduction threshold alteration occurs only in the addressed memory cells where the gate and substrate potentials coincide. Other nonaddressed memory cells receive at most one but never both of the gate and substrate potentials and are unaffected thereby, preserving the preexisting binary data everywhere in the memory other than in the memory cells comprising the addressed word. Stored data is read out by applying a gate potential intermediate the binary conduction thresholds and noting the resulting source-drain current flow.

DESCRIPTION OF THE PREFERRED EMBODIMENT

Figure 1:
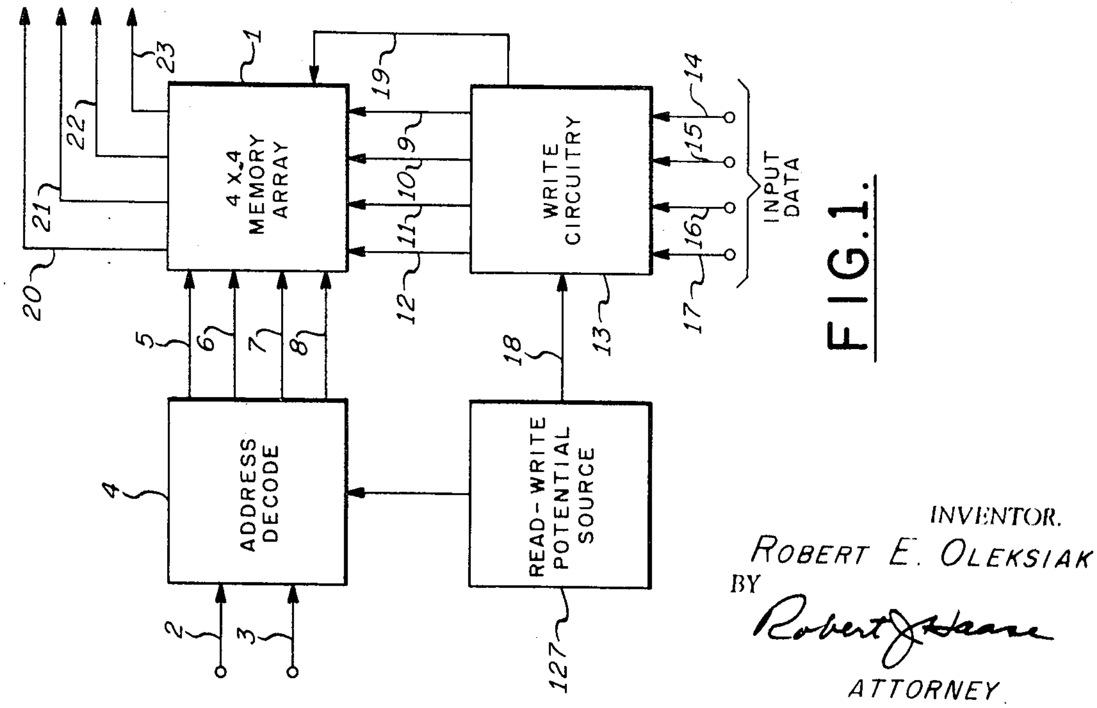
FIG. 1 is a simplified signal flow diagram showing the interconnection between the major units comprising the memory and memory driving circuits of the present invention.

The illustrative embodiment of the present invention represented in FIG. 1 comprises an array 1 of variable conduction threshold transistors arranged in four words of four bits each, i.e., a 4×4 array of 16 transistors. Individual words of the array are addressed by input signals on line 2 and 3 which are applied to address decode component 4. Component 4 places suitable potentials on one of the lines 5, 6, 7 or 8 corresponding to the address signals on lines 2 and 3. Lines 5, 6, 7 and 8 energize respective word rows of transistor memory cells within array 1. Bit columns of memory cells within array 1 are energized by lines 9, 10, 11 and 12 at the output of write circuitry 13. The potentials on lines 9, 10, 11 and 12 are determined in accordance with binary input data on lines 14, 15, 16 and 17 and whether the memory system is being operated in a writing or reading mode. Read-write potential source 127 provides potentials to address decode component 4 and to write circuitry 13 in accordance with the mode of operation (represented by the signal on line 18) as will be described later. The signal on line 18 also determines the biasing potential on line 19. The sensed value of the binary data stored in array 1 is made available on output lines 20, 21, 22 and 23 during the read cycle.

Figure 2:
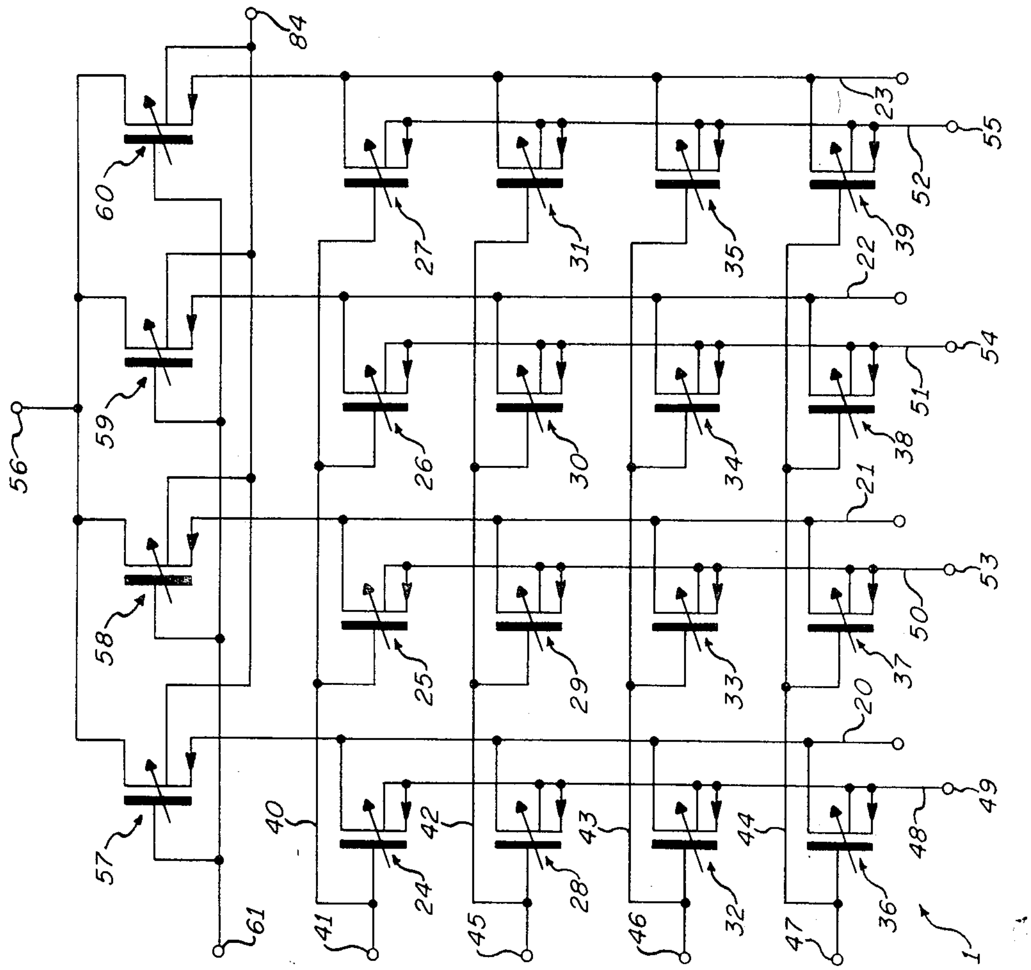
FIG. 2 is a simplified schematic circuit of the memory array component of FIG. 1.

Referring to FIG. 2, memory array 1 comprises variable threshold transistors 24–39, inclusive, each of which is designated by an arrow superimposed at the location of the gate electrode. Word line 40 connects the gate electrodes of transistors 24, 25, 26 and 27 to terminal 41. The other word lines 42, 43 and 44 are similarly connected to respective terminals 45, 46 and 47. Bit line 48 connects the substrates of transistors 24, 28, 32 and 36 to terminal 49. Similarly, bit lines 50, 51, and 52 connect substrates to respective terminals 53, 54 and 55. The source electrode of each of the variable threshold transistors is connected to the respective substrate. Thus, array 1 is connected in word-rows and bit-columns.

The drain electrodes of a given column of variable threshold transistors are connected to the potential applied to terminal 56 through a respective transistor switch 57, 58, 59 and 60. The condition of switches 57 to 60 is determined in accordance with the potential applied to terminal 84 and to terminal 61 via line 19 of FIG. 1. Lines 5, 6, 7 and 8 of FIG. 1 are connected to terminals 41, 45, 46 and 47 of FIG. 2. Lines 12, 11, 10 and 9 of FIG. 1 are connected to terminals 49, 53, 54 and 55 of FIG. 2. Output lines 20, 21, 22 and 23 of FIG. 1 are similarly designated in FIG. 2.

Each of the variable threshold transistors 24 to 39, inclusive, has the property that its turn-on (conduction threshold) gate voltage can be set to a high value or to a low value in a substantially permanent but reversible manner by applying a large negative potential or a large positive potential between the gate electrode and the substrate. Interrogation of the binary state of the transistor is accomplished by applying to the gate electrode a sensing pulse whose amplitude lies between the aforementioned high and low threshold values. If the storage element is in the ZERO state, the sensing pulse amplitude is insufficient to cause condition whereas if the element is in the ONE state, the transistor conducts. The sensing pulse is below the amplitude required to change the conduction threshold of the memory cell so that the binary state thereof is unaffected by interrogation and readout is nondestructive.

Figure 3:
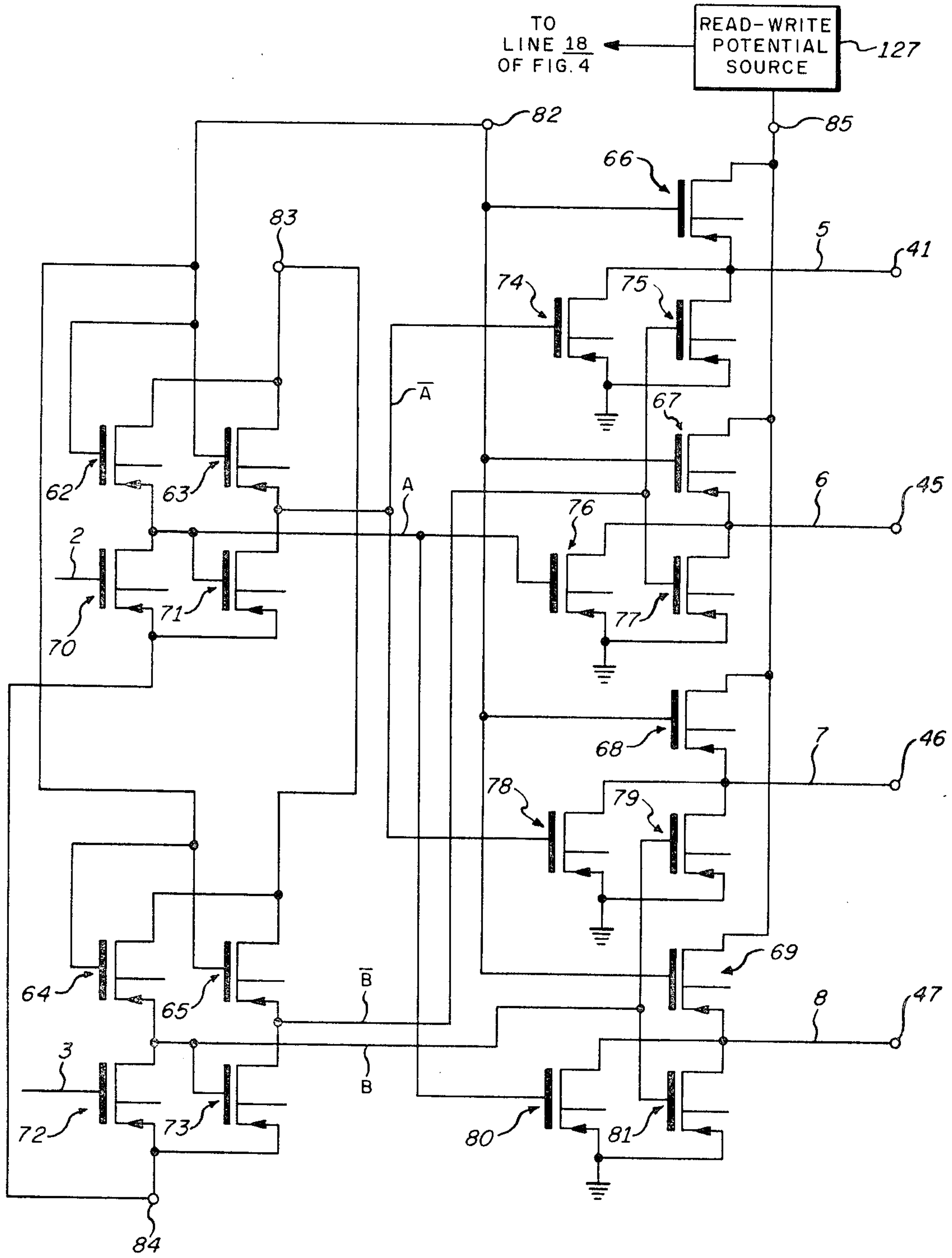
FIG. 3 is a simplified schematic diagram of the address decode component of FIG. 1.
Figure 4:
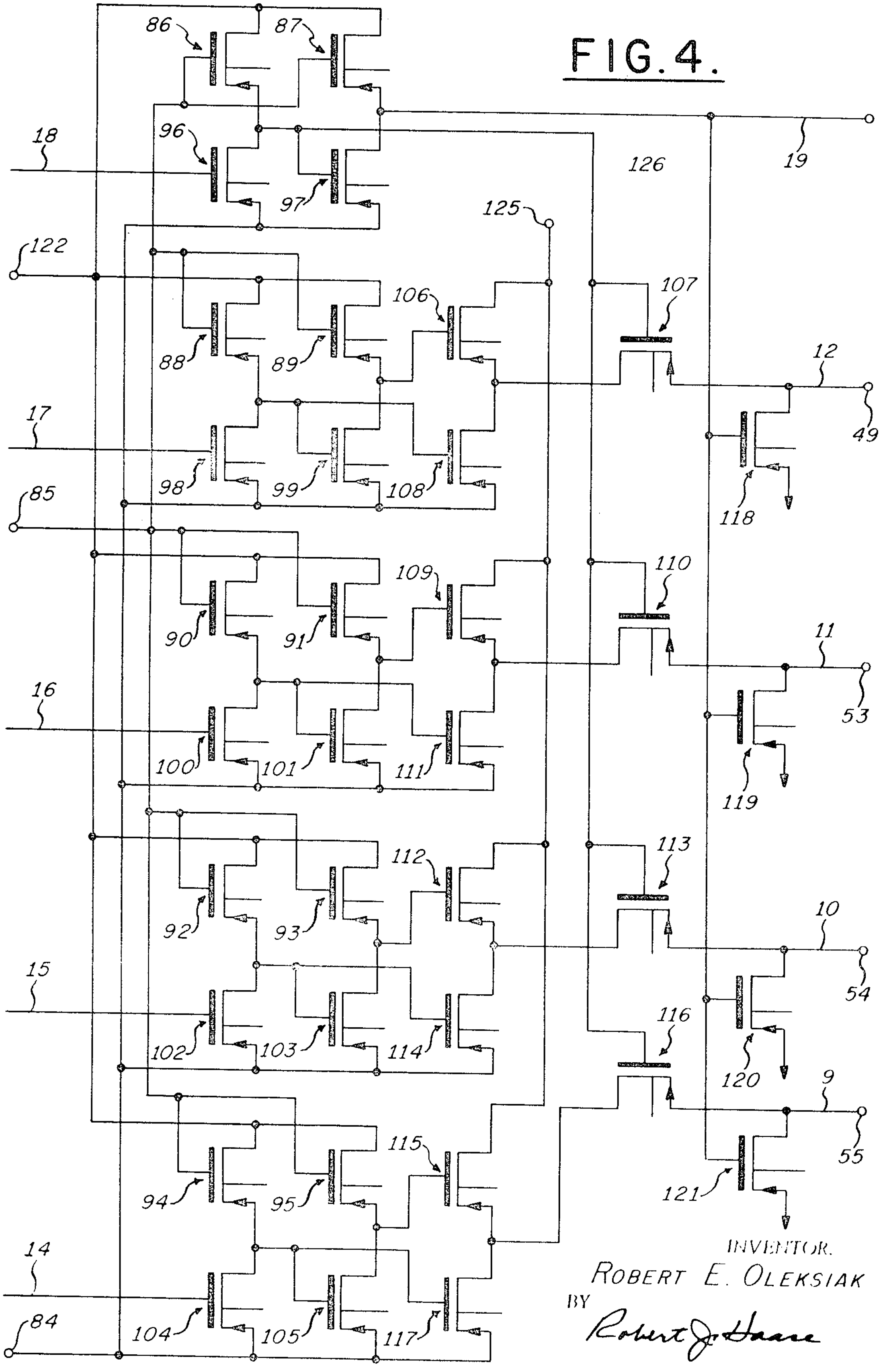
FIG. 4 is a simplified schematic diagram of the write circuitry component of FIG. 1.

The required signals for controlling the writing and reading modes of operation of the memory array of FIG. 2 are provided by the address decode component 4 and the write circuitry component 13 of FIGS. 3 and 4, respectively. Referring to FIG. 3, the address decode component comprises transistors 62–69, inclusive, which are utilized, as resistors and transistors 70–81, inclusive, which are utilized as switches. Transistors are utilized as resistors in order to simplify the integrated microelectronic circuit fabrication of the entire memory and its driving circuits utilizing essentially a single technique for all circuit elements, e.g., resistors, switching transistors and memory transistors. Fixed biasing potentials are applied to terminals 82, 83 and 84. A negative potential from source 127 is applied to terminal 85 during the read mode of operation of the memory and a binary polarity square wave potential from source 127 is applied to terminal 85 during the writing mode, The amplitude of the square wave (measured from ground potential) is half that which is necessary to change the conduction threshold of the memory transistors.

Assume that a pair of binary valued signals $\bar{A}$ and $\bar{B}$ are applied to lines 2 and 3 at the bases of transistors 70 and 72, respectively, in order to address a desired one of the word lines 5, 6, 7 and 8. The outputs of transistors 70 and 72 drive transistors 71 and 73, respectively, so that the signals at the collectors of transistors 70 and 71 may be designated by the logical notations A and $\bar{A}$, respectively, and the signals at the collectors of transistors 72 and 73 may be designated by the logical notations B and $\bar{B}$, respectively. Thus, signals representing $\bar{A}$ and $\bar{B}$ are applied to the bases of transistors 74 and 75, respectively; signals A and $\bar{B}$ are applied to the bases of transistors 76 and 77, respectively; signals representing A and B are applied to the bases of transistors 78 and 79, respectively; signals representing A and B are applied to the bases of transistors 80 and 81, respectively. Each of the corresponding transistor pairs 74,75 and 76,77 and 78,79 and 80,81 are biased to conduction to apply ground potential to the respective word lines 5, 6, 7 and 8 unless they are addressed by the signals at the bases of transistors 70 and 72. For example, if signals representing $\bar{A}$ and $\bar{B}$, respectively, are applied to lines 2 and 3, transistors 74 and 75 are cut off allowing word line 5 to assume the potential applied to terminal 85. Transistor 74 is cut off by the signal $\bar{A}$ whereas transistor 75 is cut off by the signal $\bar{B}$. During the Read mode of operation, a constant potential of −10 v. is applied to terminal 85. During the Write mode, a bipolar square wave is connected to terminal 85 having a potential of +22 v. for the first half of its cycle and −22 v. for the second half of its cycle. It will be recalled that transistor 66 functions merely as a resistor. Thus, a potential of −10 v. appears on line 5 when it is addressed during the Read mode and a square wave of ±22 v. appears on line 5 when it is addressed during the Write mode, Similar voltages appear at word lines 6, 7 and 8 during the Reading and Writing modes, when appropriate address potentials are applied to the bases of transistors 70 and 72 representing A $\bar{B}$, $\bar{A}$ B, and A B, respectively.

Referring to FIG. 4, the write circuitry component comprises transistors 86–95, inclusive, which are utilized as resistors and transistors 96–121, inclusive, which are utilized as switches. As previously mentioned, transistors are utilized as resistors to enable the use of essentially a single circuit fabrication technique for all of the necessary memory components. Fixed biasing potentials are applied to terminals 122 and 125. Ground potential is applied to line 18 during the Read mode while a +22 v. potential is applied during the Writing mode. A potential of −30 v. is applied to terminal 19 during the Read mode and a potential of +22 v. is applied during the writing mode. Transistors 118, 119, 120 and 121 are biased to conduction during the Read mode whereby ground potentials are applied to lines 12, 11, 10 and 9. Transistors 107, 110, 113, and 116 are cut off.

During the Writing mode, the potential on lines 12, 11, 10 and 9 is either −22 v. in the event that the potential applied to the respective input line 17, 16, 15 and 14 represents binary ONE or +22 v. in the event that the respective signal represents binary ZERO. THis result is achieved as follows. During the Writing mode, the ground potential applied to terminal 18 renders transistor 96 nonconductive and transistor 97 conductive whereby the potential at terminal 84 (+22 v.) is applied via conducting transistor 97 to line 19, turning transistors 118, 119, 120, and 121 off. The nonconduction of transistor 96 allows the potential at terminal 122 (−30 v.) to be applied to line 126 via transistor 86 to cause the conduction of transistors 107, 110, 113 and 116. A potential of −22 v. is applied to terminal 125 and is coupled to line 12 in the event that transistor 106 is rendered conductive. The +22 v. potential applied to terminal 84 is coupled to line 12 in the event that transistor 108 is rendered conductive. The conduction of transistor pair 106 and 108 is determined by the potential applied to line 17 representing the binary value of respective digital bit. Digital bit data on line 17 is applied to the base of transistor 98. The output of transistor 98 drives the bases of transistors 99 and 108 and the output of transistor 99 drives the base of transistor 106. Thus, when transistor 98 is turned on, transistor 108 is cut off and transistor 106 is turned on. When transistor 98 is cut off, transistor 108 is turned on and transistor 106 is cut off. The conduction of corresponding transistor pairs (109,111) and (112,114) and (115,117) are similarly determined in accordance with the binary value of the signals applied to lines 16, 15, 14, respectively.

The memory driving circuits of the present invention requires a total number of fixed threshold transistors which becomes proportionately less, relative to the number of variable threshold transistors in the memory per se, as the number of digital bits in the memory increases. For example, in the case of a 16×16 bit memory array, 246 fixed threshold and 256 variable threshold transistors are required. As the total number of bits $n^2$ of the memory array increases to large values, the ratio of the total number of transistors tor the total number of bits approaches the lower limit of one transistor per bit. Thus, the present invention minimizes the number of transistors required by the memory and by the memory driving circuits and facilitates maximum exploitation of integrated mocrocircuit technique through maximum yield.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In a computer memory utilizing variable threshold transistor memory cells for storing respective binary bit data, each said transistor having source, drain and gate electrodes formed on a substrate, each said transistor being characterized by a binary valued electrically controllable conduction threshold established in accordance with the polarity of the voltage difference between gate electrode and substrate, means for writing binary bit data into each said transistor comprising a source of binary polarity voltage, a source of controllable polarity voltage, said binary polarity voltage first being of one polarity and then being of the opposite polarity irrespective of the binary bit data to be stored, said controllable polarity voltage being of a polarity determined by the kind of binary data to be stored, means for applying said binary polarity voltage to one of said gate electrode and said substrate, and means for applying said controllable polarity voltage to the other of said gate electrode and said substrate.

2. Means for writing binary bit data as defined in claim 1 wherein said binary polarity voltage is applied to said gate electrode and said controllable polarity voltage is applied to said substrate.

3. Means for writing binary bit data as defined in claim 1 wherein the amplitude of each of said binary polarity voltage and said controllable polarity voltage is substantially one-half the amplitude required to alter the conduction threshold of each said electrically controllable conduction threshold transistor.

4. Apparatus as defined in claim 1 and further including a source of interrogation voltage having an amplitude intermediate the amplitudes of the conduction thresholds of each said electrically controllable conduction threshold transistor, and means for applying said source of interrogation voltage to said gate electrode.

5. Apparatus as defined in claim 4 wherein said binary polarity voltage is applied to said gate electrode and said controllable polarity voltage is applied to said substrate.

6. Apparatus as defined in claim 4 wherein the amplitude of each of said binary polarity voltage and said controllable polarity voltage is substantially one-half the amplitude required to alter the conduction threshold of each said electrically controllable conduction threshold transistor.

* * * * *